United States Patent [19]

Drake

[11] Patent Number: 4,864,072

[45] Date of Patent: Sep. 5, 1989

[54] SOLVENT RECOVERY FROM SOLUTIONS OF ORGANIC ALUMINUM COMPOUND

[75] Inventor: Charles A. Drake, Nowata, Okla.

[73] Assignee: Phillips Petroleum Company, Bartlesville, Okla.

[21] Appl. No.: 213,941

[22] Filed: Jul. 1, 1988

[51] Int. Cl.$^4$ ................................................ C07C 7/10
[52] U.S. Cl. ...................................... 585/868; 502/111
[58] Field of Search .......................... 502/111; 585/868

[56] References Cited

U.S. PATENT DOCUMENTS

| | | | |
|---|---|---|---|
| 2,913,447 | 11/1959 | Jacob et al. | 260/94.9 |
| 2,963,520 | 12/1960 | Neal | 260/676 |
| 3,153,027 | 10/1964 | Magemeyer, Jr. et al. | 260/94.9 |
| 3,562,348 | 2/1971 | Jenkins | 585/868 X |
| 3,584,427 | 12/1969 | Hillman | 260/94.7 |
| 4,022,839 | 5/1977 | Beuther et al. | 585/868 X |
| 4,211,670 | 7/1980 | Vandenberg | 252/429 B |
| 4,363,746 | 12/1982 | Capshew | 252/429 B |
| 4,588,704 | 5/1986 | Drake et al. | 502/111 |

*Primary Examiner*—Patrick P. Garvin
*Attorney, Agent, or Firm*—K. K. Brandes

[57] ABSTRACT

The hydrocarbon solvent contained in a solution of an organoaluminum compound is recovered by a process comprising contacting the solution with water at a volume ration of from about 3:1 to about 8:1. Preferably, the solvent is n-hexane, the organoaluminum compound is triethylaluminum sesquichloride, and the solution has been used in a process for preparing olefin polymerization catalysts.

20 Claims, No Drawings

SOLVENT RECOVERY FROM SOLUTIONS OF ORGANIC ALUMINUM COMPOUND

BACGROUND OF THE INVENTION

This invention relates to a process for recovering liquid hydrocarbon solvent from solutions comprising dissolved organic aluminum compounds, such as those which are used in the preparation of olefin polymerization catalysts.

In the multi-step preparation of catalysts for polymerizing olefins (e.g., ethylene), frequently catalyst intermediates are formed which are washed with an organic solution, such as n-hexane. For instance, in the catalyst preparation described in U.S. Pat. No. 4,363,746, the disclosure of which is herein incorporated by reference, one step comprises contacting $MgCl_2$ with a solution of an organoaluminum compound, in particular ethylaluminum sesquichloride (EASC), dissolved in a hydrocarbon solvent. The thus contacted $MgCl_2$ is washed with an inert hydrocarbon solvent, e.g., n-hexane.

It is desirable to recover clean solvent from the used wash solution (in particular EASC-contaminated n-hexane). This can be accomplished by contacting the used wash solution with water and allowing two separate phases (an aqueous phase and an organic solvent phase) to form, as has been described in U.S. Pat. No. 4,588,704, the disclosure of which is herein incorporated by reference. However, as has been pointed out in U.S. Pat. No. 4,588,704, an undesirable solid precipitate of hydrolyzed organoaluminum compounds frequently forms during the contacting step and interferes with the solvent recovery process. Furthermore, a relatively large volume of water is required for recovering a hydrocarbon solvent which is clear and pure enough for recycle to the catalyst preparation reactor. The inventor of the instant invention has discovered a method which essentially eliminates solid precipitate formation and requires less water than the method of U.S. Pat. No. 4,588,204.

SUMMARY OF THE INVENTION

It is an object of this invention to recover liquid hydrocarbon solvent from a solution comprising an organoaluminum compound. It is another object of this invention to recover liquid hydrocarbon solvent from said solution without substantial solids formation. It is a further object of this invention to recover hydrocarbon solvent from said solution and to recycle said recovered hydrocarbon solvent to a reactor for preparing an olefin polymerization catalyst. Other objects and advantages will be apparent from the detailed description and the appended claims.

According to this invention, in a process which comprises the steps of (a) contacting (i) a solution comprising at least one organoaluminum compound in a liquid (i.e., liquid at 25° C./1 atm.) hydrocarbon solvent with (ii) water; (b) allowing a first layer which contains primarily said hydrocarbon solvent and a second layer which contains primarily water to form; and (c) separating said first layer from said second layer, the improvement comprises carrying out said contacting in step (a) at a volume ratio of said solution to water in the range of from about 3:1 to about 8:1.

In a preferred embodiment, the solvent is at least one hydrocarbon (aliphatic or cycloaliphatic or aromatic) having 5 to 12 carbon atoms per molecule, more preferably at least one aliphatic hydrocarbon (alkane) having 5-7 carbon atoms per molecule. In another preferred embodiment, the organoaluminum compound is ethylaluminum sesquichloride (EASC). In still another preferred embodiment, the volume ratio of said solution to water is in the range of from about 4:1 to about 6:1.

In a further preferred embodiment, the process of this invention comprises the additional steps of (a*) withdrawing said solution, before contacting with water in step (a), from a reactor in which an olefin polymerization catalyst is prepared; and (d) introducing the hydrocarbon solvent contained in the first layer, after separation step (c), to said reactor.

DETAILED DESCRIPTION OF THE INVENTION

Any organoaluminum compound can be contained in solution (i) used in step (a) of the treatment process of this invention. Non-limiting examples of such organoaluminum compounds are: trihydrocarbylaluminum of the general formula $R_3Al$, wherein each R is individually selected from the group consisting of alkyl, cycloalkyl, aryl, alkaryl, aralkyl and cycloalkaryl radicals having from 1 to 20 carbon atoms per radical; dihydrocarbylaluminum monohalides of the general formula $R_2AlX$, with each R as defined above and X being a halogen (preferably chlorine) atom; monohydrocarbylaluminum dihalides of the general formula $RAlX_2$, with R and X as defined above, wherein each X can be the same or different; and hydrocarbylaluminum sesquihalides having the general formula $R_3Al_2X_3$, with each R and X as defined above. At present, the preferred organoaluminum compound is ethylaluminum sesquichloride (EASC), $(C_2H_5)_3Al_2Cl_3$.

Any normally liquid hydrocarbon solvent can be contained in solution (i) used in step (a). The hydrocarbon solvent can be at least one alkane (straight chain or branched) or cycloalkane (unsubstituted or alkyl-substituted) or aromatic hydrocarbon (unsubstituted or alkyl-substituted or cycloalkyl-substituted), or mixtures of the above. Generally the hydrocarbon contains 5–12 carbon atoms per molecule, preferably 5–7 carbon atoms per molecule. More preferably, the hydrocarbon solvent is an alkane selected from the group consisting of n-pentane, isopentanes, n-hexane, isohexanes, n-heptanes and isoheptanes. At present, n-hexane is most preferred.

The solution used in step (a) can contain other organometallic compounds such as titanium tetrahydrocarbyloxides $Ti(OR)_4$, with R being a hydrocarbyl radical as defined above, preferably titanium tetraethoxide. Other organometallic compounds which can also be present are titanium halotrihydrocarbyloxides, titanium dihalodihydrocarboxides, organomagnesium compounds (Grignard compounds), organozirconium compounds, and the like.

Any suitable concentration of the organoaluminum compound (i.e., one compound or mixture of organoaluminum compounds) in the solution used in step (a) can be used. Preferably, the weight percentage of the organoaluminum compound is in the range of from about 0.1 to about 20 weight percent, more preferably from about 0.5 to about 12 weight percent. If at least one organotitanium compound is present, its concentration can be in the range of from about 0.2 to about 20 percent, in particular from about 2 to about 12 weight percent. Presently preferred solutions used in step (a) are those obtained from processes for preparing catalysts for olefin polymerization (in particular ethylene polymerization), as disclosed in U.S. Pat. Nos. 4,588,704 and 4,363,746. Particularly suitable solutions are described in Example I.

The contacting of (i) with (ii) in step (a) can be carried out in any suitable apparatus, either in a batch operations or in a continuous operation, preferably with agitation. Any suitable contacting conditions can be employed. Preferably the temperature is in the range of from about 10° to about 60° C., at about atmospheric conditions, for a period of time in the range of from about 1 minute to about 10 hours. It is presently preferred to use substantially pure water (pH: about 6–8) in step (a). However, it is within the scope of this invention to have minor amounts of solutes contained in the water, e.g., substances suitable for raising the pH (e.g., to about 9) or surfactants or agents for facilitating the separation of hydrocarbon and aqueous layers in step (b). The volume ratio of (i) to (ii) genrally is in the range of from about 3:1 to about 8:1, preferably from about 4:1 to about 6:1.

Any suitable apparatus, method or conditions for allowing the formation of the hydrocarbon layer and the aqueous layer in step (b) can be employed. Generally, the liquid medium found in step (a) is kept in the apparatus of step (a) under non-agitating conditions for a period of time sufficient to produce two substantially clear layers in step (b), generally about 0.1 to about 5 hours.

The two-layer system obtained in step (b) can be separated in any suitable manner in step (c), such as draining the lower (generally aqueous) layer, or pumping off the upper layer or the lower layer or both layers; and the like. Optionally, the layer which contains primarily the hydrocarbon solvent can undergo additional purification treatment, such as fractional distillation, fraction crystallization, and the like. Such additional purifications are especially designed to remove minor amounts of water and solute contained in the hydrocarbon layer, so that the recovered hydrocarbon can again be used as solvent for organometallic compounds without causing hydrolysis or other undesirable reactions with these compounds.

In a preferred embodiment, the solution used in step (a) is withdrawn as a decant stream or filtrate or wash solution from a reactor in which a process for preparing an olefin polymerization catalyst is carried out as described in U.S. Pat. Nos. 4,363,746 and 4,588,704. In this preferred embodiment, the separated and recovered hydrocarbon obtained in step (c) is further purified (as described above) and is reused as solvent for organoaluminum compounds or as wash liquid in one of the above-cited processes for preparing an olefin polymerization catalyst. The aqueous layer obtained in step (c) can be disposed off in any suitable and environmentally safe method, optionally after treatment with alkaline materials (e.g., $NH_3$, NaOH), so as to neutralize acidic hydrolysis products which are formed in step (a) and which are concentrated in the aqueous layer.

The following examples are presented to further illustrate the invention and are not to be considered as unduly limiting the scope of this invention.

EXAMPLE I

This example illustrates the preparation of an ethylene polymerization catalyst, said preparation resulting in various liquid waste streams containing n-hexane.

A catalyst precursor composition was precipitated from a solution in a dry, air-free 100 gal (379 L) Pfaudler reactor containing 57 gallons (216 L) of dry n-hexane, 12.3 lbs of $MgCl_2$ and 54 lbs of Ti tetraethoxide (TTEO), over a 4 hour time period, by addition of 117 lbs of a 25 weight percent solution of ethylaluminum sesquichloride (EASC) dissolved in n-hexane (about 16 gallons). The mother liquor above the solids amounting to about 65 gal (246 L) was decanted through a tube containing an internal filter (for removal of suspended solids), and the filtrate was transferred to a holding tank (1) for subsequent treatment in accordance with the procedure described in Example II. The mother liquor in holding tank (1), which fumed when exposed to moist air, contained about 10 weight-% EASC and about 10 weight-% TTEO.

The precipitated solids were then washed twice with n-hexane by admixing the solids with n-hexane, allowing them to settle and decanting the wash liquid. In the first wash, 50 gal (190 L) of n-hexane was employed, and in the second wash 40 gal (151 L) of n-hexane was used. The total wash liquid (90 gal) after decanting was transferred to another holding tank, labeled holding tank (2), for subsequent treatment in accordance with the procedure described in Example II.

The washed, precipitated solids were then admixed with 40 gal of n-hexane, the reactor was purged with ethylene gas and the pressure was reduced to about 2 psi (14 kPa). The reactor was then charged with 16 lbs of the EASC solution, equivalent to about 7.3 moles EASC in about 2.2 gal (8.3 L) of n-hexane, and 1.6 lbs (0.73 kg) of liquid ethylene. After stirring for 30 minutes, residual ethylene was purged from the reactor with nitrogen, the solids allowed to settle and the supernatant liquid, about 42 gal (150 L) was decanted and transferred to holding tank (1). The catalyst precursor was washed three times with 40 gal n-hexane per wash as described above and the total 120 gal decant liquid was passed to holding tank (2), mentioned above. The combined EASC-contaminated wash solution contained in holding tank (2) contained about 2 weight-% EASC.

The reactor containing particulate catalyst precursor with applied ethylene prepolymer was admixed with 40 gal of n-hexane and 36 lbs (16.4 kg) of $TiCl_4$. After mixing 1 hour, the resulting catalyst solids were allowed to settle and 40 gal of the mother liquor comprising n-hexane and unreacted $TiCl_4$ was decanted and thereafter treated for n-hexane recovery (not described here).

The catalyst solids were then washed 5 times with portions of n-hexane, as described above. In the first wash, 50 gal of n-hexane was employed. In the remaining 4 washes, 40 gal n-hexane per wash were used. The total decant liquid was transferred to a holding tank. The purified catalyst in slurry form was sent to a dry, nitrogen or argon filled receiver for storage.

EXAMPLE II

This example illustrates the treatment of EASC-contaminated n-hexane solutions, obtained in the catalyst preparation process described in Example I, for recovery of n-hexane.

A series of tests was carried out with 10 mL (milliliter) portions of the EASC-contaminated n-hexane solution from holding tank (1) of Example I and varying amounts of water ranging from 1 to 50 mL. The following results were obtained and are presented in Table I.

TABLE I

| Hydrolysis of EASC-Contaminated n-Hexane | | | |
|---|---|---|---|
| Run No. | mL EASC/hexane | mL water | Results |
| 1 | 10 | 50 | Solids precipitated |
| 2 | 10 | 20 | " |
| 3 | 10 | 10 | " |
| 4 | 10 | 5 | " |
| 5 | 10 | 2 | No solids formed |
| 6 | 10 | 1 | Solids precipitated |

The solids formed are believed to be mainly hydrated alumina resulting from the hydrolysis of the EASC present in the n-hexane solution. The surprising result shown in run 5 indicated that ready separation of the hydrocarbon phase and the water phase could be performed at a volume ratio of the hexane solution to water of about 5:1, without interfering solids being formed.

The hydrocarbon phase can be sent to a fractional distillation column for recovery of pure, water-free n-hexane, which can be stored and recycled to the catalyst production zone when needed. The aqueous bottom phase can be sent to a holding pond, preferably after further treatment with an alkaline material (e.g., $NH_3$ or NaOH) for neutralizing HCl which is formed by hydrolysis of EASC.

The above-discussed treatment of EASC-contaminated n-hexane with water was also carried out with the EASC-contaminated n-hexane wash solution from holding tank (2) (See Example I), essentially as described above. Again, at a 5:1 volume ratio of hexane solution to water, no solids formation was observed.

Reasonable variations and modifications are possible within the scope of the disclosure of this invention and the appended claims.

That which is claimed:

1. In a process which comprises the steps of (a) contacting (i) a solution comprising at least one organoaluminum compound selected from the group consisting of dihydrocarbylaluminum monohalides, monodrocarbylaluminum dihalides and hydrocarbylaluminum sesquihalides in a liquid hydrocarbon solvent with (ii) water; (b) allowing the formation of a first layer which contains primarily said hydrocarbon solvent and of a second layer which contains primarily water; and (c) separating said first layer from said second layer, the improvement which comprises carrying out said contacting in step (a) at a volume ratio of said solution to water of about 5:1.

2. A process in accordance with claim 1 wherein said at least one organoaluminum compound is at least one hydrocarbylaluminum sesquihalide of the general formula $R_3Al_2X_3$, wherein each R is individually selected from the group consisting of alkyl, cycloalkyl, aryl, alkaryl, aralkyl and cycloalkaryl radicals having from 1 to 20 carbon atoms per radical; and each X is individually selected from the group consisting of halogen atoms.

3. A process in accordance with claim 1 wherein said at least one organoaluminum compound is ethylaluminum sesquichloride.

4. A process in accordance with claim 1 wherein said liquid hydrocarbon solvent comprises at least one hydrocarbon selected from the group consisting of alkanes, cycloalkanes and aromatic hydrocarbons.

5. A process in accordance with claim 4 wherein said at least one hydrocarbon is selected from the group consisting of alkanes containing 5–12 carbon atoms per molecule.

6. A process in accordance with claim 5 wherein said at least one hydrocarbon is n-hexane.

7. A process in accordance with claim 1 wherein the concentration of said at least one organoaluminum compound in said solution is in the range of from about 0.1 to about 20 weight percent.

8. A process in accordance with claim 1 wherein said contacting is carried out at a temperature in the range of from about 10° to about 60° C. for a period of time in the range of from about 1 minute to about 10 hours.

9. A process in accordance with claim 1, additionally comprising the steps of
    (a*) withdrawing said solution, before said contacting with water in step (a), from a reactor in which an olefin polymerization catalyst is prepared, and
    (d) introducing said hydrocarbon solvent contained in said first layer, after said separating in step (c), to said reactor.

10. In a process which comprises the steps of (a) contacting (i) a solution comprising at least one organoaluminum compound and at least one organotitanium compound in a liquid hydrocarbon solvent with (ii) water; (b) allowing the formation of a first layer which contains primarily said hydrocarbon solvent and of a second layer which contains primarily water; and (c) separating said first layer from said second layer,
    the improvement which comprises carrying out said contacting in step (a) at a volume ratio of said solution to water of about 5:1.

11. A process in accordance with claim 10 wherein said at least one organoaluminum compound is selected from the group consisting of trihydrocarbylaluminum, dihydrocarbylaluminum monohalides, monohydrocarbylaluminum dihalides and hydrocarbylaluminum sesquihalides.

12. A process in accordance with claim 10 wherein said solution comprises about 0.1–20 weight percent of said at least one organoaluminum compound and about 0.2–20 weight percent of said at least one organotitanium compound.

13. A process in accordance with claim 10 wherein said at least one organotitanium compound is selected from the group consisting of titanium tetrahydrocarbyloxides, titanium halotrihydrocarbyloxides and titanium dihalodihydrocarboxides.

14. A process in accordance with claim 13 wherein said at least one organotitanium compound has the general formula $Ti(OR)_4$, wherein each R is individually selected from the group consisting of alkyl, cycloalkyl, aryl, alkaryl, aralkyl and cycloalkaryl radicals having from 1 to 20 carbon atoms per molecule.

15. A process in accordance with claim 14 wherein said at least one organotitanium compound is titanium tetraethoxide.

16. A process in accordance with claim 11 wherein said at least one organoaluminum compound is at least one hydrocarbylaluminum sesquihalide of the general formula $R_3Al_2X_3$, wherein each R is individually selected from the group consisting of alkyl, cycloalkyl, aryl, alkaryl, aralkyl and cycloalkaryl radicals having from 1 to 20 carbon atoms per radical; and each X is individually selected from the group consisting of halogen atoms.

17. A process in accordance with claim 10 wherein said at least one organoaluminum compound is ethylaluminum sesquichloride.

18. A process in accordance with claim 10 wherein said at least one hydrocarbon is selected from the group consisting of alkanes containing 5–12 carbon atoms per molecule.

19. A process in accordance with claim 18 wherein said at least one hydrocarbon is n-hexane.

20. A process in accordance with claim 10 wherein said contacting is carried out at a temperature in the range of from about 10° to about 60° C. for a period of time in the range of from about 1 minute to about 10 hours.

* * * * *